Feb. 24, 1970    R. BACKMAN    3,497,053
SLIP CLUTCH ARRANGEMENT WITH FORWARD SPEED
CONTROL AND REVERSE LOCKING
Filed April 25, 1968    2 Sheets-Sheet 1
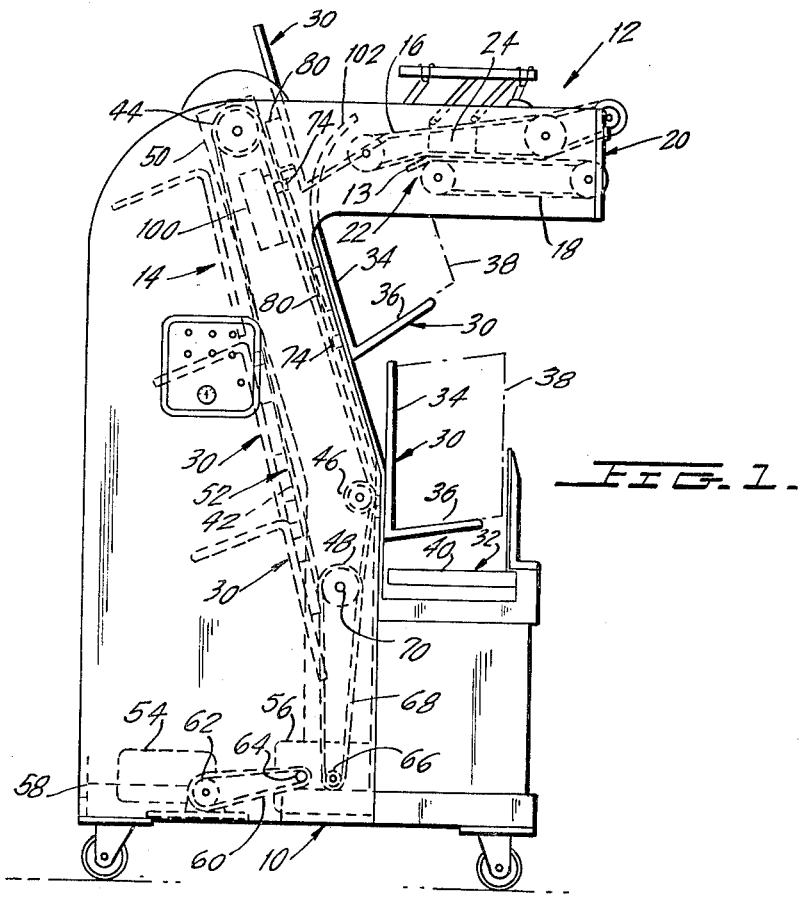
INVENTOR.
RALF BACKMAN
BY
OSTROLENK, FABER, GERB & SOFFEN
ATTORNEYS

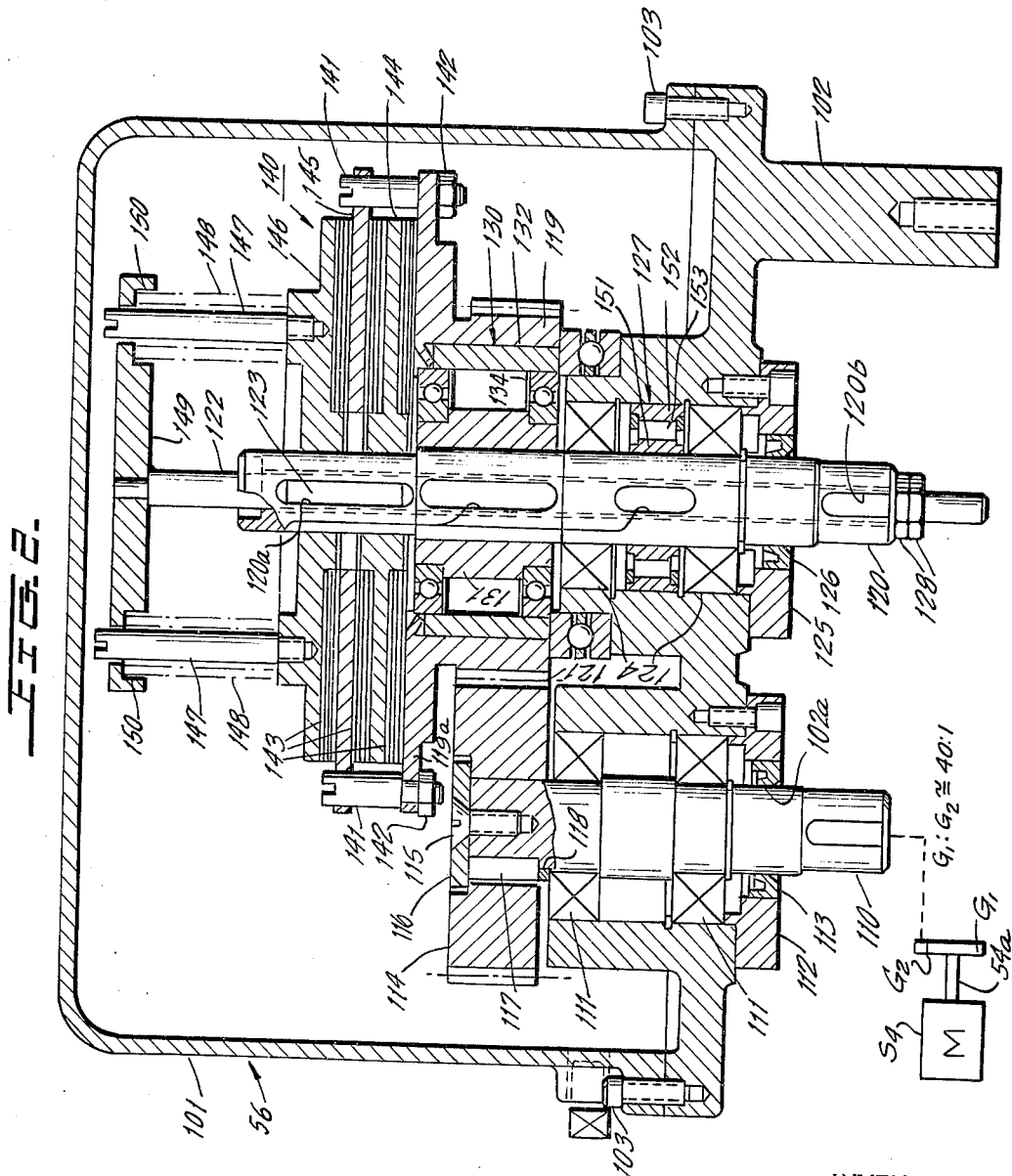

United States Patent Office 3,497,053
Patented Feb. 24, 1970

3,497,053
SLIP CLUTCH ARRANGEMENT WITH FORWARD SPEED CONTROL AND REVERSE LOCKING
Ralf Backman, Solna, Sweden, assignor to Industrial Developments AB, Sundbyberg, Sweden
Filed Apr. 25, 1968, Ser. No. 724,156
Int. Cl. B65g 57/00, 23/00
U.S. Cl. 198—35                                          3 Claims

ABSTRACT OF THE DISCLOSURE

A slip clutch particularly useful with a stacker is provided with forward speed control and reverse locking by means of the provision of a pair of overrunning clutches. Each of the overrunning clutches is connected to the driven shaft of the slip clutch. One overrunning clutch is coupled between the driven shaft and the main driving shaft. This clutch prevents the driven shaft from rotating at a speed greater than it is being driven by the driving shaft by coupling it back to the driving shaft. The worm gear motor brakes the attempt of the driven shaft to overrun by means of the high gear ratio between the driving shaft and the motor making motor rotation substantially irreversible. The second overrunning clutch couples the driven shaft to the stationary frame of the slip clutch. This clutch permits the forward rotation of the driven shaft but prevents its backward rotation.

BACKGROUND OF THE INVENTION

This invention is concerned with slip clutches and more particularly is concerned with slip clutches particularly useful for stacking machines which have means to prevent the external load from rotating the driven shaft either forward at a speed greater than it is being driven by the drive shaft or in the reverse direction.

High speed stackers for newspapers, magazines, etc. have a peculiar need for slip clutches. One such stacker employing a slip clutch is shown in application Ser. No. 527,436 filed Feb. 15, 1966 and now U.S. Patent No. 3,429,239, by John R. Murchison et al. and assigned to Developments and Control Limited. Stackers of the type disclosed in application Ser. No. 527,436 employ a plurality of buckets for the reception and stacking of newspapers, magazines, etc. These buckets are moved by an endless conveyor chain and receive the articles to be stacked from an in feed conveyor. During the interval of time that a bucket receives articles from the conveyor belt, it is necessary to arrest the movement of the bucket immediately following the bucket receiving such articles so as to prevent its interference with the flow of articles to the bucket being loaded. It is also necessary to arrest the immediately following bucket so as to place it in a position whereby it may be snapped into place for receiving the articles and thereby cleanly cut the flow of articles to the first bucket and thereby provide an accurate count.

In the stacker of the above-mentioned application Ser. No. 527,436 it becomes necessary to prevent the movement of the conveyor chain during certain intervals while the movement of a bucket is arrested. However, it is also desirable that the bucket and conveyor chain resume a normal and constant speed immediately upon the release of the bucket. In order to provide for the resumption of a constant speed of the conveyor chain immediately upon the release of the bucket without continually stopping and starting the motor, it is necessary to permit the motor driving the conveyor chains to continue running during the arrest of the conveyor chains. This function is performed by a slip clutch.

While the stacker of application Ser. No. 527,436 teaches the use of a slip clutch to permit the motor to run continuously when the conveyor chains are arrested, the slip clutch of that stacker does not provide for the many additional functions necessary for the efficient and accurate use of a stacker.

One deficiency of the stacking machines of the type disclosed in application Ser. No. 527,436 is that they are not provided with a driving mechanism which will move the buckets, which are being loaded and lowered, at a substantially constant speed or, in the alternative, in an accurately controlled manner. This is necessary so as to maintain the distance from the infeed conveyor delivering the newspapers or magazines, etc. to the bucket receiving such articles from becoming so great that the newspapers, magazines, etc. curl over before they are stacked and thereby prevent proper stacking. In stackers of the above-described application the tendency is for the speed at which the buckets are lowered to be increased as the buckets are loaded because of the additional weight imposed on the chains by the articles being stacked. As explained above, it is necessary to prevent this increased weight from increasing the speed at which the buckets are lowered.

Also as described in the above-mentioned application, it is necessary that the stacker buckets be initially snapped down, a predetermined time after being arrested, into position to receive the newspapers, magazines, etc. and to cleanly intercept the stream of articles so as to provide an accurate count per bundle for each and every bundle stacked by the machine. This snapping action produces a force on the conveyor chains which have a tendency to move the chains and buckets at a speed greater than desirable. It is necessary, therefore, to prevent the snapping action accelerating the buckets to attain a speed greater than the desired speed.

Another problem often encountered in the above-referred to stacker is the tendency of the conveyor chain to be moved in a reverse direction to that which it is supposed to be moved for the purposes of loading. This tendency arises where the number of buckets used is uneven and the weight of the buckets on the side opposite the side of loading is greater than the weight on the side of loading. The uneven weight distribution produces a force counter to the force of desired movement. With the previous slip clutches employed, this counterforce would be detrimental in that the chain might actually move backwards and thereby prevent the newspapers or magazines from stacking properly. In addition, it would prevent accurate counts since the bucket to be snapped into position for receiving the articles to be stacked would not be snapped into position fast enough since the accelerating springs for each bucket are loaded in a non-uniform manner.

In the past, attempts to correct many of the above deficiencies have been unsuccessful. One such attempt has been to increase the loading tension of the slip clutch engaging face plates to prevent reverse rotation. The result of this approach causes the face plates of the slip clutches to wear out quickly, leaving the above problem still to be resolved.

It is the purpose of the instant invention to solve the above problems encountered in present-day stackers by providing a new and novel slip clutch having means for preventing the undesired rapid movement of the conveyor chain in a forward direction and having additional means for preventing any undesired movement whatsoever of the conveyor chain in the reverse direction. It is a further purpose of this invention to provide a new and novel slip clutch capable of controlling the lowering of the loading rack or bucket of a stacking machine to eliminate lowering of the buckets at greater than desired speeds and thereby insure more uniform and accurate stacking.

A further object of this invention is to provide a stacking machine in combination with a slip clutch which prevents the backward movement of the stacking buckets and conveyor chain.

Another object of this invention is to provide a stacking machine and slip clutch whereby speed of the conveyor chains is controlled by an incremental drive unit.

A further object of this invention is to provide a stacking machine and slip clutch whereby the loading bucket may be placed in its loading position by means of snap action and thereafter dropped at a controlled incremental rate.

It is a further object of this invention to provide a stacking machine in which the dropping rate of the loading bucket is not significantly influenced by the changing weight of the bucket being loaded.

It is another object of this invention to provide a stacking machine in which the number of racks or buckets employed may be odd or even as desired and in no way affects the operation.

A further object of this invention is to provide a simple and inexpensive slip clutch with forward and reverse locking by means of the use of two simple over-running clutches.

In one embodiment of this invention a slip clutch is provided which is especially suitable for a stacking machine. The slip clutch includes a first or driving shaft which is rotated by a motor in conjunction with the operation of the stacking machine. The gear ratio of the motor to the driving shaft is of the order of 40 to 1 so that the gear coupling acts as a brake when the shaft has any external force applied to it. The driving shaft is provided with a first gear which gear engages a second gear mounted upon and free to rotate in a first direction about a driven shaft. This second gear is also associated with a plurality of discs or plates which form the slip clutch mechanism and which control the driven shaft. An over-running clutch is associated with the second gear and the driven shaft in a manner such that the second gear is free to move in a first direction with respect to the movement of the shaft. However, the driven shaft cannot move in said first direction with respect to the motion of the second gear. As a result of this, if an external force is applied to the driven shaft in the first direction, this force will be transferred to the second gear in the form of an increase in angular velocity which, in turn, will transfer this force back to the first gear, hence to the driving shaft and thereby attempt to ultimately couple this increase in angular velocity to the driving motor. However, the high gear ratio between the motor and the driving shaft will prevent this increase in angular velocity to the driving shaft and the driven shaft. In other words, the overrunning clutch is free running in one direction to permit the second gear to rotate at an angular velocity greater than the driven shaft in a first direction but is not free running when the drive shaft attempts to rotate in the first direction at an angular velocity greater than that of the second gear thereby limiting the rotation of the driven shaft to a speed no greater than the rotational speed of the motor (taking into account the gear ratios of the two above mentioned gear assemblies).

Also connected to the driven shaft is a second overrunning clutch. This second overrunning clutch is also connected to the frame of the slip clutch. The second overrunning clutch is associated with the frame and the driven shaft in a manner such that the driven shaft may be rotated in said first direction with respect to the frame but not in the reverse direction with respect to the frame. The result is that the driven shaft is prevented from rotating in a direction opposite to the direction in which it is being driven by the driving shaft.

The foregoing objects, advantages, features and results of the present invention together with various other objects, advantages, features and results thereof which will be evident to those skilled in the art to which the invention relates in the light of this disclosure may be achieved with the exemplary embodiment of the invention described in detail hereinafter and illustrated in the accompanying drawings, in which:

FIGURE 1 is a side elevational view of a stacking machine in which the novel slip clutch is incorporated to form the stacking machine of the instant invention;

FIGURE 2 is a top cross-sectional view of the slip clutch of the instant invention employing over-running clutch assemblies;

FIGURES 3a and 3b are front and sectional views respectively of a clutch assembly which may advantageously be used in the slip clutch of the instant invention.

FIGURES 4a and 4b are front and sectional views respectively of a second clutch assembly employed in the slip clutch assembly of the invention.

Referring to FIGURE 1 of the drawings, a stacker peculiarly suitable for combination with the slip clutch of the instant invention is designated generally by the numeral 10. For a detailed description of this stacker, reference is made to the above-mentioned application incorporated herein by reference thereto.

In brief, the stacker 10 includes an in-feed conveyor section 12 for delivering a stream of newspapers 13 in conventional overlapping relation to a stacking section 14. The in-feed conveyor section 12 comprises upper and lower conveyors 16 and 18 which receive a stream of overlapped newspapers therebetween at the upstream end 20 of the in-feed conveyor section and which discharge the newspaper stream at the downstream end 22 thereof. In addition to these basic components, the in-feed conveyor section 12 also includes means 24 for counting the newspapers passing between the upper and lower conveyors 16 and 18.

The stacking section 14 of the stacker 10 includes a series of receptacles 30 movable in single file along the path which extends downwardly from the downstream or discharge end 22 of the in-feed conveyor section 12 to an out-feed or take-away conveyor section 32. The receptacles 30 are preferably L-shaped racks having spaced parallel back rails 34 terminating in spaced parallel fingers 36 capable of forming and supporting stacks 38 of newspapers, magazines, etc. The take-away conveyor section 32 comprises spaced parallel rollers 40 (only one of which is visible in FIGURE 1) between which the fingers 36 of the rack 30 pass so as to deposit the stacks 38 on the rollers 40 in sequence as the racks move downwardly past the take-away section 32.

The racks 30 are moved downwardly from the in-feed conveyor section 12 to the out-feed conveyor section 32 by two parallel endless chains 42 trained over upper, intermediate and lower sprockets 44, 46 and 48 respectively, suitably mounted on an upright frame 50 of the stacker 10. Thus, the racks 30 move downwardly from the upper sprocket 44 to the lower sprocket 48 along the downwardly extending path hereinbefore discussed. Subsequently, the racks 30 move upwardly from the lower sprocket 48 to the upper sprocket 44 along an upwardly extending path.

The chains 42 constitute part of a restrainable conveyor means 52 for propelling the racks 30 along their desired path. More particularly, the chains 42 are capable of having their movement arrested or restrained for a purpose which will be described hereinafter. To achieve this, the chains 42 which are sometimes referred to therein as conveyor members, are driven by an electric motor 54 through the novel slip clutch 56 which will be described in detail hereinafter. The motor 54 and the slip clutch 56 are mounted on a suitable base 58 which carries the upright frame 50 of the stacker 10 and are interconnected by a chain 60. More specifically, the motor 54 and the slip clutch 56 are respectively provided with output and input sprockets 62 and 64 around which the chain 60 is trained. The slip clutch 56 is provided with an output sprocket 66 drivingly connected by a chain 68 to a sprocket fixed on a shaft 70 on which the lower sprocket 48 for the chains 42 are fixed. Thus, the motor 54 drives the chains 42 through the slip clutch 56 which permits arresting the downward movement of the racks 30 from the in-feed conveyor section 12 to the take-away conveyor section 32 as will be described in more detail hereinafter. The motor 54 is provided with a conventional worm gear assembly (not shown) having a gear ratio of the order of 40:1 to prevent overrunning of the output sprocket 66 as will be more fully described.

The racks 30 are guided along their downwardly extending path from the in-feed conveyor section 12 to the outfeed conveyor section 32 by a guide means as is more fully explained in the above referred to application Ser. No. 527,436. Also, as is more fully explained in the above referred to application, the stacker 10 includes a stop means 100 engageable with each of the racks 30 to retrain it against further downward movement when it reaches a position such that its fingers 36 are just above the stream of overlapping newspapers, magazines, etc. being discharged by the in-feed conveyor section 12. The restrained rack 30 remains in its arrested position until the required number of newspapers has been deposited to form the stack 38 on the rack 30 beneath the arrested rack, this number being determined by the counting means 24 together with control means (not shown).

Each rack is coupled to the chains 42 by means of a lost motion connector generally shown as 80 which is more fully described in the above referred to application. It will be apparent that as the downward movement of each rack 30 is arrested by the stop means 100 the conveyor chains 42 continue to move as a result of the lost motion connection of the rack to the chains. This movement of the chain continues until blocked by an additional means included in the lost-motion assembly and more fully described in the above-referred to application. Thereafter, the stop means 100 restrains the conveyor chains 42 as well as the arrested rack 30, such restraint of the conveyor chains being permitted by the slip clutch 56, as will be explained in more detail hereinafter.

When the rack 30 has been loaded with the number of newspapers, magazines, etc. as determined by the counting means 24, the stop means 100 is disengaged from the arrested rack and the arrested rack is snapped into position to receive additional newspapers, magazines, etc. enabling formation of a new stack. This sudden snapping action of the rack 30 into position is the result of the lost motion coupling between the rack and the chains 42 which includes snap-action spring biasing means not shown herein for purposes of simiplicity. As a result of the sudden downward movement of the arrested rack 30, the stream of articles to be stacked is cleanly cut off from the loaded stack. After the arrested rack 30 has been snapped downwardly the conveyor chains resume their downward movement to move the previously arrested rack downwardly at a speed conforming to the rate at which the newspapers are discharged from the in-feed conveyor section. It is noted that this speed must be at a predetermined rate to assure proper and uniform stacking.

It will be noted that in the above-described stacker it is necessary to have a slip clutch such that the motor may continue to run while the chains 42 are arrested to avoid the need for constantly starting and stopping motor 54. It is further necessary to have a means for preventing the undesirable increase in velocity or movement of the chains 42, beyond the controlled movement of motor 54, upon the snapping of the rack 30 into position upon the loading of the rack with additional newspapers, magazines, etc. which tend to produce a force to move the chains at a greater rate. It is further noted that the stacker must be provided with a means to prevent the backward movement of the chains 42 as a result of any greater forces on the left or back side of the chains 42 of FIGURE 1 if an uneven number of racks are used or if an uneven weight distribution (due to any other cause) urges the chains rearwardly. The unbalanced weight due to the uneven distribution of the buckets may occur when small bundles are being formed. Also the springs which stretch the bucket at the intercept point (see springs 94 of FIGURE 5 of copending application No. 670,729) tend to pull the bucket chain rearwardly. These problems are all solved by the slip clutch of the instant invention. Referring to FIGURE 2, the slip clutch is generally shown as 56. The slip clutch includes a hollow casing 101 mounted upon a base member 102 by means of socket head screws 103. Base 102 may be mounted to the stacker frame in any suitable manner.

The frame 102 includes a bore 102a through which driving shaft 110 extends. Driving shaft 110 is connected to sprocket 64 shown in FIGURE 1 and is driven by the motor 54 by means of chain 60. The motor 54 has an irreversible worm gear with a ratio of the order of 40:1. The sprocket 62 is placed on the outgoing worm gear shaft 54a.

The driving shaft is connected to the frame by means of bearings 111 to permit the rotation of the driving shaft relative to the slip clutch enclosure. Also connected to the frame is sealing cover 112 and a seal 113 for the driving shaft.

A gear 114 is rigidly connected to the opposite end of driving shaft 110 by means of screw 115, washer 116 and a key 117. The key 117 prevents relative rotation of the shaft 110 with respect to the gear 114. The gear 114 is separated from the bearing and frame 102 by means of a spacer or washer 118.

Gear 114 engages gear 119 of the driven shaft 120 at 121. Gear 119 is not connected directly to the driven shaft 120 but instead is connected to the shaft 120 through the slippage mechanism and through a first overrunning clutch in the form of a sprag assembly 130. A sprag assembly such as employed herein is shown in greater detail in FIGURE 3, as will be described hereinafter.

The gear 119 is connected to the slippage mechanism generally shown as 140 by means of screws 141 and nuts 142 which pass through openings provided in the outwardly extending gear flange 119a. The slippage mechanism 140 consists of friction discs 143, lower driven disc 144, intermediate driving disc 145 and an upper driven disc 146 and the upper surface of flange 119a. Connected to the upper driven disc 146 by means of screws 147 and springs 148 is a pressure plate 149. The pressure plate 149 includes a plurality of bores 150 arranged at spaced intervals near its periphery for the purpose of positioning the springs 148. Rod 122 passes directly through a hole in the shaft 120 and is free to experience axial movement relative to the shaft 120. The rod passes through a seal (not shown) at the lower end of shaft 120. The key 123 secured to shaft 122 drives the discs 144 and 146 but not disc 145 which is connected to the gear disc 119. The shaft 120 is also connected to the internal race 131 of sprag 130 for reasons to be explained hereinafter.

The shaft 120 extends through the frame 102 and is journalled to the frame 102 by means of bearings 124. The shaft 120 is further provided with a sealing cover 125 and a seal 126. Also connecting the shaft 120 to the casing 102 is the sprag 127. The function of this sprag 127 will be described in greater detail hereinafter. The rod 122 and nuts 128 are adjustable to provide suitable contact pressure between the discs 119a and 143–146. Shaft 120 is threaded at its lower end to threadedly engage the pair of nuts 128 positioned at the exterior end of the shaft 120 for the purpose of adjusting the pressure plate 149 and driven discs 144 and 146 to thereby adjust the bearing pressure between engaging faces of members 119a and 143–146. Shaft 122 is free to move within shaft 120 since it is not connected to shaft 120. The shaft 120 is provided with a keyed portion 120b for receiving and rigidly coupling a sprocket (not shown) thereto.

FIGURES 3a and 3b show a clutch assembly suitable for use in the slip clutch of FIGURE 2. The clutch assembly is generally shown as 130. This assembly includes an internal and external race 131 and 132 respectively, and a plurality of roller members or bearings 134 located between the races. It is noted that the internal and external races may be the shaft 120 and the internal surface of gear 119, respectively, or they may be distinct parts. Ball bearings 170 and 171 are mounted in pairs adjacent both sides of assembly 130 (note FIGURE 3b) to maintain spacing between the inner and outer races. It is noted that the movement of the bearings is restricted and somewhat biased so that the bearings 134 are always touching the inner race at 131a and the outer race at 132a. As a result, there is always instantaneous action between the bearings and the races.

FIGURE 3b is a partially sectionalized view of the clutch assembly 130 which connects the gear 119 to the shaft 120 of FIGURE 2. The inner race 131 is connected to the shaft 120. The outer race 132 is connected to the gear 119. As can be seen in FIGURE 3a, each member 134 is urged toward the right (relative to FIGURE 3a) by member 131b which spacing (between surfaces 132a and 131a) tapers. As a result, the outer race 132 which is connected to the gear 119 is permitted to rotate in the direction of arrow 160 with respect to the inner race 131 at greater velocity since the member 134 does not exert any force upon the races other than the slight frictional force produced by its slight wiping contact with the races 131 and 132. Since the gear 119 is permitted to rotate in direction 160 with respect to the inner race 131 and thereby with respect to the shaft 120, the assembly 130 does not impede or otherwise affect the slippage of the slip clutch and the motor 154 may continue to operate while the shaft 120 is held stationary. However, the inner race 131 is prevented from moving in a direction counter to arrow 160 relative to the outer race 132 (or conversely race 131 may not move in the direction counter to arrow 160 at a speed greater than the clockwise movement of race 132) since the tapered region referred to above blocks movement between the inner race 131 and the outer race 132. As a result, if an external clockwise force is applied to the shaft 120, this force is transferred from the inner race 131 to the outer race 132 through the members 134 without any relative movement between the inner race 131 and the outer race 132. Since the outer race 132 is connected to the gear 119 this force is then transferred from the gear 119 through gear 114 to the driving shaft 110 and thereby to the driving motor 54. As a result of the above described gear ratios, the motor acts as a brake to prevent the shaft 120 from rotating at a speed greater than that which it is being driven.

FIGURES 4a and 4b show another clutch assembly 127. The shaft 120 is connected to the inner race 151 of the assembly 127. The frame 102 is connected to the outer race 152 of assembly 127. Individual roller members 153 are situated between the inner race 151 and the outer race 152. Bias members 154 urge bearings 153 toward the tapered region defined by surfaces 152a and 151a. In this assembly, the inner race 151 is permitted to rotate in the direction of arrow 155 with respect to the outer race 152, by reason of the same principles described above with respect to assembly 130. In this manner, the shaft 120 is again permitted to rotate in a clockwise direction relative to race 152 without being impeded by the assembly 127. However, the inner race 151 is not permitted to rotate in a direction counter to arrow 155 with respect to the outer race 152 (or conversely race 151 may not move counter to arrow 155 at a speed greater than the rotational speed of race 152). Since race 152 is held stationary, race 151 cannot move at all in the counterclockwise direction as a result of the above-mentioned tapered regions. Therefore, any external force applied to the shaft 120 counter to arrow 155 is prevented from producing any counter rotation by means of assembly 127 which transfers the correct force from the shaft 122 through the sprag assembly 127 to the frame 102 which is stationary and acts as a brake.

A description of the operation of the slip clutch in cooperation with the stacker of FIGURE 1 will now be given. When the rack 30 is being loaded with newspapers, magazines, et cetera, from the in-feed conveyor 12, the chains 42 continue to move until the movement is arrested as described earlier. During this movement the shaft 120 of the slip clutch is rotated by means of the driving shaft 110, the gear 114, gear 119 and slippage mechanism 140. The clutch assemblies 130 and 127 do not impede this forward movement of shaft 120, since the shaft 120 is rotating at a speed no greater than the speed of gear 119 and since the assembly 127 does not impede clockwise rotation of the shaft 120. When the chains 42 are arrested, the shaft 120 no longer rotates. However, the motor is free to continue rotating by means of the slippage mechanism 140. Since the shaft 120 is stationary, the locking effect of the assembly 127 does not come into play and the assembly 130 does not prevent slippage since the outer race 132 is permitted to rotate in a direction clockwise with respect to the inner race 131.

After the rack 30 has been loaded and the above rack 30 is snapped into position, as explained previously, the locking effect of the assembly 130 comes into play in that it prevents this snapping action of the rack 30 (or any other forces acting on chains 42) from moving the chain 42 at a speed greater than that at which it is being driven. This forward locking occurs since the inner race 131 of the assembly 130 is prevented from being rotated clockwise with respect to the outer race 132 as explained above. This prevents the inner race 131 from rotating in the clockwise direction at a speed greater than the speed of rotation of outer race 132. In the same manner, the sprag assembly 130 prevents the shaft 120 from being rotated at a greater speed than is desired as a result of the loading of the racks 30.

If an uneven number of racks 30 are being used and/or small bundles are being formed, the assembly 127 will prevent any backward movement of the chains 42 which is caused in the following manner:

The arrested bucket, through its lost-motion device, causes chains 42 to be restrained from moving. This, in turn, causes the slip clutch to allow the motor to continue running even through the chains 42 are motionless. The restraint of the chains occurs just at the time that the biasing springs of the lost-motion device as fully charged.

An uneven weight distribution (such as an uneven number of buckets attached to chains 42) will cause the chains to move in the backward direction discharging the charged springs by an appreciable amount. Also the charged springs cause the restrained bucket to move rearwardly. Once the latch restraining the locked bucket is released rapid acceleration of that bucket to the desired speed will be less than the normal acceleration desired due to partial discharge of the charged springs, resulting in an inaccurate interception of the newspaper stream directed from the infeed conveyor toward the buckets. The assembly 127 completely eliminates this problem since its inner race 151 which is connected to the shaft 120 is prevented from moving in a direction counterclockwise with respect to the outer race 152 which is connected to the frame 102.

As a result of the clutch assemblies used in this slip clutch, previous problems existing in stacking machines have been corrected.

It is further noted that as a result of the assembly 127 which prevents the reverse movement of the shaft 120, it is not necessary to apply great pressure to the pressure plate 150 in order to prevent the backward movement of the shaft 120. As a result, the surface pressure of the slip clutch engaging members may be significantly reduced while still performing its desired function, thereby greatly increasing the useful operating life of the friction discs.

Although the instant invention has been described with respect to a preferred embodiment thereof, it should be understood that many variations and modifications will now be obvious to those skilled in the art, such as the use of various types of overrunning clutches and the location of sprag assemblies or other forms of overrunning clutches in different positions and such as the employment of the slip clutch in different stacking machines or in different machines suited to such slip clutches.

What is claimed is:

1. In an apparatus for stacking articles, the combination of:

receptacles movable in a single file along a predetermined path and each adapted to receive a group of the articles;

restrainable conveyor means for moving said receptacles along said path;

motor means for moving said restrainable conveyor means;

slip clutch means connected between said motor means and said restrainable conveyor means;

said slip clutch means including a first shaft connected to said motor means for rotation by said motor means in a first direction;

said slip clutch means further including a second shaft connected to said restrainable conveyor means for moving said restrainable conveyor means in a first direction responsive to rotation of said first shaft by said motor means;

coupling means in said slip clutch means for coupling said second shaft to said first shaft for rotating said second shaft in response to rotation of said first shaft;

said coupling means including slippage means for permitting said first shaft to rotate when said second shaft is held stationary in response to said restrainable conveyor means being restrained;

said slip clutch means further including means connected between said second shaft and said first shaft for preventing said second shaft from being rotated by said restrainable conveyor means at a speed greater than it is being rotated by said motor means; and means in said slip clutch means connected to said second shaft for preventing said restrainable conveyor means from rotating said second shaft in a direction oppostie to the direction in which it is being rotated by said motor means.

2. In an apparatus for stacking articles, the combination as defined in claim 1 wherein said slip clutch means includes a stationary frame and wherein said means for preventing said second shaft from rotating in a direction opposite to the direction in which it is rotated by said motor means includes an overrunning clutch assembly connected between said frame and said second shaft.

3. In an apparatus for stacking articles, the combination as defined in claim 1 wherein said coupling means further includes a first gear connected to said first shaft and a second gear coupling said first gear to said slippage means; and wherein said means for preventing said second shaft from being rotated at a speed greater than it is being rotated by said motor means includes an overrunning clutch assembly connected to said second gear and said second shaft.

References Cited

UNITED STATES PATENTS 3,418,895   12/1968   Palmer     198—35 X

EDWARD A. SROKA, Primary Examiner

U.S. Cl. X.R.

198—35